United States Patent
Hong

(10) Patent No.: US 12,490,080 B2
(45) Date of Patent: Dec. 2, 2025

(54) RESPONSE INDICATION METHOD, AND RESPONSE DETERMINATION METHOD AND DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 416 days.

(21) Appl. No.: 18/018,242

(22) PCT Filed: Aug. 28, 2020

(86) PCT No.: PCT/CN2020/112266
§ 371 (c)(1),
(2) Date: Jan. 26, 2023

(87) PCT Pub. No.: WO2022/041144
PCT Pub. Date: Mar. 3, 2022

(65) Prior Publication Data
US 2023/0217242 A1 Jul. 6, 2023

(51) Int. Cl.
*H04W 68/02* (2009.01)
*H04W 8/20* (2009.01)
*H04W 68/00* (2009.01)

(52) U.S. Cl.
CPC ......... *H04W 8/205* (2013.01); *H04W 68/005* (2013.01)

(58) Field of Classification Search
None
See application file for complete search history.

(56) References Cited

U.S. PATENT DOCUMENTS

| 2012/0076085 A1 | 3/2012 | Chou |
| 2022/0191824 A1* | 6/2022 | Kumar ................. H04W 68/02 |

FOREIGN PATENT DOCUMENTS

| CN | 101111061 A | 1/2008 |
| CN | 105530024 A | 4/2016 |

OTHER PUBLICATIONS

PCT/CN2020/112266 English translation of International Search Report dated May 27, 2021, 2 pages.
Indian Patent Application No. 202347006853, Office Action dated Jul. 27, 2023, 6 pages.
European Patent Application No. 20950814.2, Search and Opinion dated Sep. 19, 2023, 11 pages.
Sony "Solution KI#1Busy Indication as a paging response" SA WG2 Meeting #136, S2-1912408, Nov. 2019, 5 pages.
3rd Generation Partnership Project; Technical Specification Group Services and System Aspects; Study on system enablers for devices having multiple Universal Subscriber Identity Modules (USIM)(Release 17), Jan. 2020, 36 pages.

* cited by examiner

*Primary Examiner* — Gary Lafontant
(74) *Attorney, Agent, or Firm* — Cozen O'Connor

(57) ABSTRACT

A response indication method, performed by a terminal which is at least provided with a first Subscriber Identity Module card, includes: receiving a paging message through the first SIM card; and sending indication information to a base station that sends the paging message; in which the first SIM card does not respond to the paging message, the indication information indicates to the base station that the first SIM card is not to respond to the paging message. Other reasons for sending the indication information are also discussed.

18 Claims, 13 Drawing Sheets

--- receiving a paging message through the first SIM card — S101 in response to the first SIM card not responding to the paging message, sending indication information to a base station that sends the paging message, in which the indication information is configured to indicate to the base station that the first SIM card is not responding to the paging message — S102

RESPONSE INDICATION METHOD, AND RESPONSE DETERMINATION METHOD AND DEVICE

CROSS-REFERENCE TO RELATED APPLICATION

This application is a U.S. national phase of International Application No. PCT/CN2020/112266, filed on Aug. 28, 2020, the entire content of which is incorporated herein by reference.

TECHNICAL FIELD

The disclosure relates to the field of communication technologies, and particular to paging operations between a terminal and a base station in a wireless communication network.

BACKGROUND

In a communication process between a base station and a terminal, the base station can page the terminal by sending a paging message, to establish a communication connection with the terminal.

However, in some cases, the terminal does not respond to the paging message even though the terminal receives the paging message. In these cases, the base station is not sure whether it is a problem with itself or a problem with the terminal that causes the terminal to not respond to the paging message.

SUMMARY

According to a first aspect of embodiments of the disclosure, a response indication method, performed by a terminal, is provided. The terminal is at least provided with a first Subscriber Identity Module (SIM) card. The method includes:
  receiving a paging message through the first SIM card;
  in response to the first SIM card not responding to the paging message, sending indication information to a base station that sends the paging message; in which the indication information is configured to indicate to the base station that the first SIM card is not to respond to the paging message.

According to a second aspect of embodiments of the disclosure, a response determination method, performed by a base station, is provided. The method includes:
  sending a paging message to a first SIM card in a terminal; and
  receiving indication information sent by the terminal, and determining that the first SIM card is not to respond to the paging message based on the indication information.

According to a third aspect of embodiments of the disclosure, an electronic device is provided. The electronic device includes:
  a processor;
  a memory for storing instructions executable by the processor; in which
  the processor is configured to implement the response indication method and/or the response determination method.

According to a fourth aspect of the disclosure, a computer readable storage medium storing computer programs is provided. When the computer programs are executed by a processor, the response indication method and/or the response determination method is implemented.

BRIEF DESCRIPTION OF THE DRAWINGS

In order to clearly illustrate the technical solution of the embodiments of the disclosure, a brief description of drawings used in the embodiments is given below. Obviously, the drawings in the following descriptions are only part of the embodiments of the disclosure, and for those skilled in the art, other drawings can be obtained according to these drawings without inventive works.

DETAILED DESCRIPTION

Description will be made clearly and completely to the technical solution of the embodiments of the disclosure with reference to the accompanying drawings. Obviously, the embodiments described here are only part of the embodiments of the disclosure and are not all embodiments of the disclosure. Based on the embodiments of the disclosure, other embodiments obtained by those skilled in the art without inventive works are within the scope of the disclosure.

Figure 1:
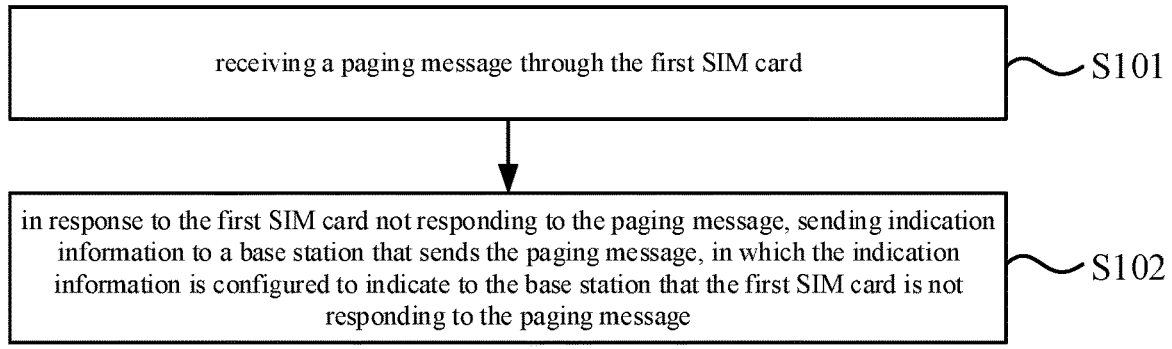
FIG. 1 is a flowchart of a response indication method according to an embodiment of the disclosure.

FIG. 1 is a flowchart of a response indication method according to an embodiment of the disclosure. The response indication method shown in this embodiment may be performed by a terminal. The terminal includes, but is not limited to, electronic devices such as a cell phone, a tablet computer, a wearable device, a sensor, and an Internet of Things (IoT) device. The terminal may communicate as a user device with a base station. The base station includes, but is not limited to, a base station in a communication system, such as a 4G base station, a 5G base station, and a 6G base station. In an embodiment, the base station may be a base station performing the response determination method described in any of the subsequent embodiments.

One or more Subscriber Identity Module (SIM) cards may be provided in the terminal. For example, the terminal includes a first SIM card, or the terminal includes a first SIM card and a second SIM card. In a case that multiple SIM cards are provided in the terminal, some or all of the SIM cards of the multiple SIM cards may access different operator networks respectively or the same operator network. The communication modes supported by the multiple SIMs can be set as desired, such as dual SIM single standby, dual SIM dual standby single active, and dual SIM dual standby dual active.

As shown in FIG. 1, the response indication method may include the following steps.

At step S101, a paging message is received through the first SIM card.

At step S102, in response to the first SIM card not responding to the paging message, indication information is sent to a base station that sends the paging message.

The indication information is configured to indicate to the base station that the first SIM card is not to respond to the paging message.

After the base station sends the paging message to the first SIM card in the terminal (e.g., by broadcasting), if no response to the paging message is received from the first SIM card, e.g., if the first SIM card initiates a random access, it is difficult for the base station to determine whether the first SIM card does not respond to the paging message due to a problem of the base station itself or an internal problem of the terminal, and the base station may mistakenly determine that the first SIM card does not respond to the paging message due to low power of the paging message, thus the base station may increase the power and/or frequency of sending the paging message, to enable the first SIM card to receive the paging message and then respond to the paging message.

However, when the first SIM card does not respond to the paging message due to the internal problem of the terminal, even if the base station performs the operation of increasing the power and/or frequency of the paging message, it cannot make the first SIM card respond to the paging message, and thus the operation performed by the base station is wasted.

According to the embodiments of the disclosure, in a case that the first SIM card does not respond to the paging message, the indication information can be sent to the base station that sends the paging message, to indicate to the base station that the first SIM card is not to respond to the paging message, so that the base station can determine that the first SIM card has received the paging message but does not respond to the paging message, i.e., it is determined that the first SIM card does not respond to the paging message due to an internal problem of the terminal rather than a problem of the base station itself. Therefore, unnecessary operations such as increasing the power and/or frequency of sending the paging message can be avoided, which is conducive to saving the resources of the base station.

Figure 2:
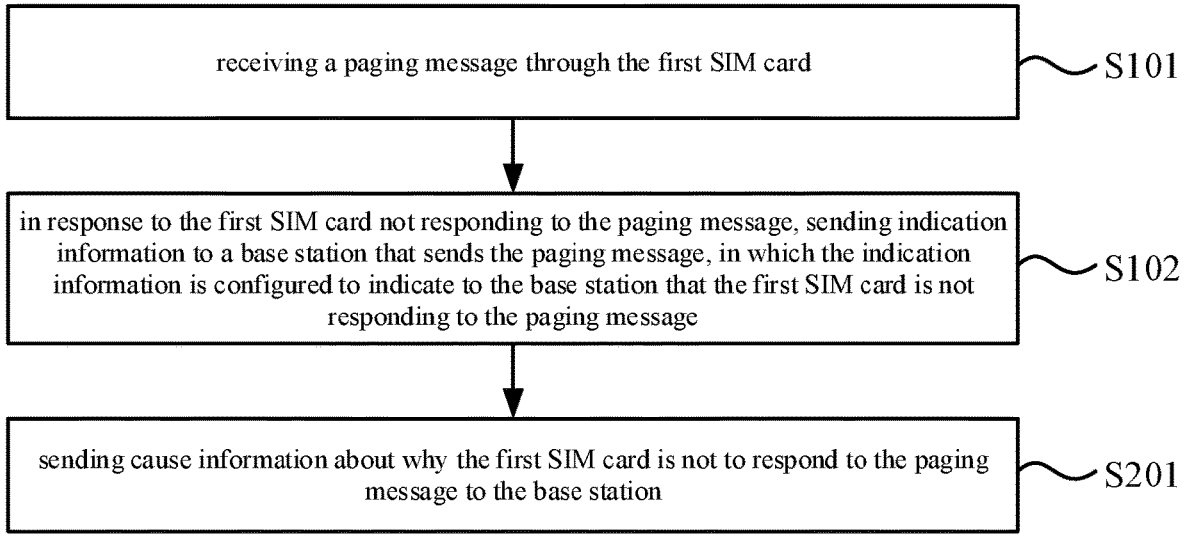
FIG. 2 is a flowchart of a response indication method according to another embodiment of the disclosure.

FIG. 2 is a flowchart of a response indication method according to another embodiment of the disclosure. In some embodiments, as shown in FIG. 2, the method further includes the following steps.

At step S201, cause information of the first SIM card is not to respond to the paging message is sent to the base station.

In an embodiment, not only the indication information is sent to the base station to make it clear to the base station that the first SIM card is not to respond to the paging message, but also a reason why the first SIM card does not respond to the paging message is sent to the base station, to enable the base station determine why the first SIM card does not respond to the paging message, so that the base station can perform subsequent operations based on the reason.

In some embodiments, the cause information includes at least one of:

a confliction between an operation in response to the paging message and a communication operation of a second SIM card in the terminal, or canceling, by a user, the operation in response to the paging message.

In a case that a second SIM card is also provided in the terminal, if the reason why the first SIM card does not respond to the paging message is that the communication operation currently performed by the second SIM card conflicts with the operation in response to the paging message, the reason may be sent to the base station. The reason may be that a priority of the communication operation performed by the second SIM card is higher than a priority of the operation responding to paging message of the first SIM card.

The reason why the first SIM card does not respond to the paging message can also be that the operation in response to the paging message is cancelled by the user.

The operation in response to the paging message may be cancelled by the user in real time. For example, after the first SIM card receives the paging message, the user may be prompted whether to respond to the paging message or not, and the user may cancel the response to the paging message in real time.

The operation in response to the paging message may be cancelled based on a preset setting of the user. For example, the user may operate in advance to set that the first SIM card does not respond to the paging message after receiving the paging message, then the first SIM card automatically determines not to respond to the paging message after receiving the paging message.

It should be noted that either the first SIM card or the second SIM card does not refer to a particular SIM card, and the first SIM card and the second SIM card can be any two different SIM cards in the terminal. In addition, the cause information is not limited to the above two examples, but may also include: terminal failure, network failure and other reasons. The technical solutions of reporting the cause information of not responding to the paging information to the base station should be considered by those skilled in the art to fall within the scope of protection claimed in this disclosure.

Figure 3:
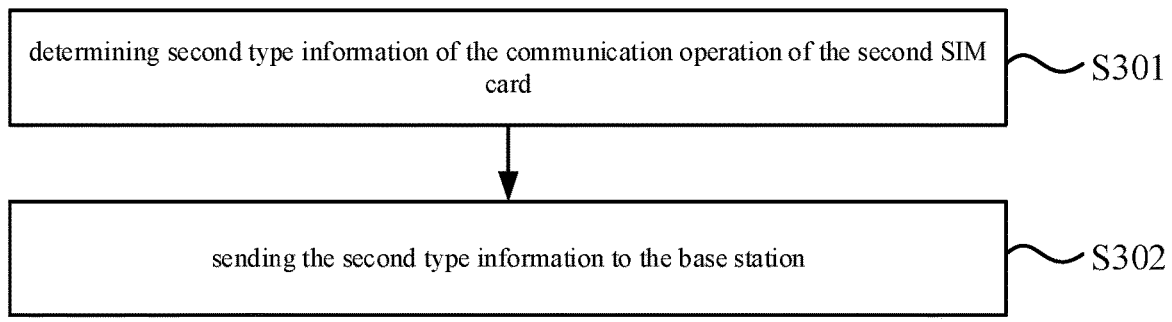
FIG. 3 is a flowchart of a response indication method according to another embodiment of the disclosure.

FIG. 3 is a flowchart of a response indication method according to another embodiment of the disclosure. In some embodiments, the cause information of the first SIM card does not respond to the paging message sent to the base station includes the confliction between the operation in response to the paging message and the communication operation of the second SIM card in the terminal. As shown in FIG. 3, the response indication method includes the following steps.

At step S301, second type information of the communication operation of the second SIM card is determined.

At step S302, the second type information is sent to the base station.

In an embodiment, when the cause information of the first SIM card does not respond to the paging message is that the operation in response to the paging message conflicts with the communication operation of the second SIM card in the terminal, the terminal may determine the second type information of the communication operation of the second SIM card and then send the second type information to the first SIM card. Then the first SIM card sends the second type information to the base station, so that the base station can perform subsequent actions based on the second type information. For example, the base station determines the priority of the communication operation of the second SIM card and the priority of the operation in response to the paging message of the first SIM card based on the second type information.

In a case that the first SIM card and the second SIM card belong to the same operator network, the second type information may also be sent to the base station by the second SIM card.

In an embodiment, the second type information includes, but is not limited to, the second SIM card being in a call, or the second SIM card also needing to respond to a paging message. The second type information may further include a service type of a service corresponding to the communication operation. For example, the services may be divided into enhanced mobile broadband (eMBB), Ultra Reliable Low Latency Communication (URLLC) and Massive Machine Type Communication (mMTC), or may be divided into video service, voice service, and message service.

Figure 4:
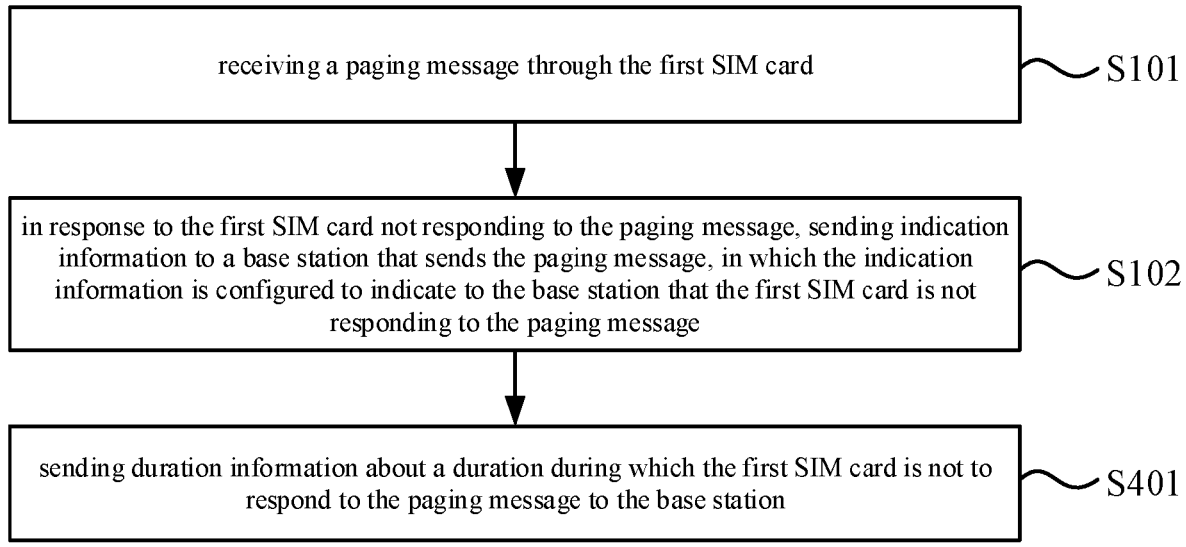
FIG. 4 is a flowchart of a response indication method according to another embodiment of the disclosure.

FIG. 4 is a flowchart of a response indication method according to another embodiment of the disclosure. In some embodiments, as shown in FIG. 4, the response indication method includes the following steps.

At step S401, duration information about a duration during which the first SIM card is not to respond to the paging message is sent to the base station.

In an embodiment, not only the indication information is sent to the base station to make it clear to the base station that the first SIM card is not to respond to the paging message, but also the duration information about the duration during which the first SIM card is not to respond to the paging message is sent to the base station, to enable the base station to determine how long the first SIM card is not to respond to the paging message, so that the base station can perform subsequent operations based on that cause. For example, the paging message is not sent to the first SIM during the duration during which the first SIM does not respond to paging message to save resources, and the paging message is sent to the first SIM after the duration during which the first SIM does not respond to paging message.

It should be noted that the cause information, the second type information, the duration information in the above embodiments can be sent to the base station together with the indication information or separately from the indication information as needed.

Figure 5:
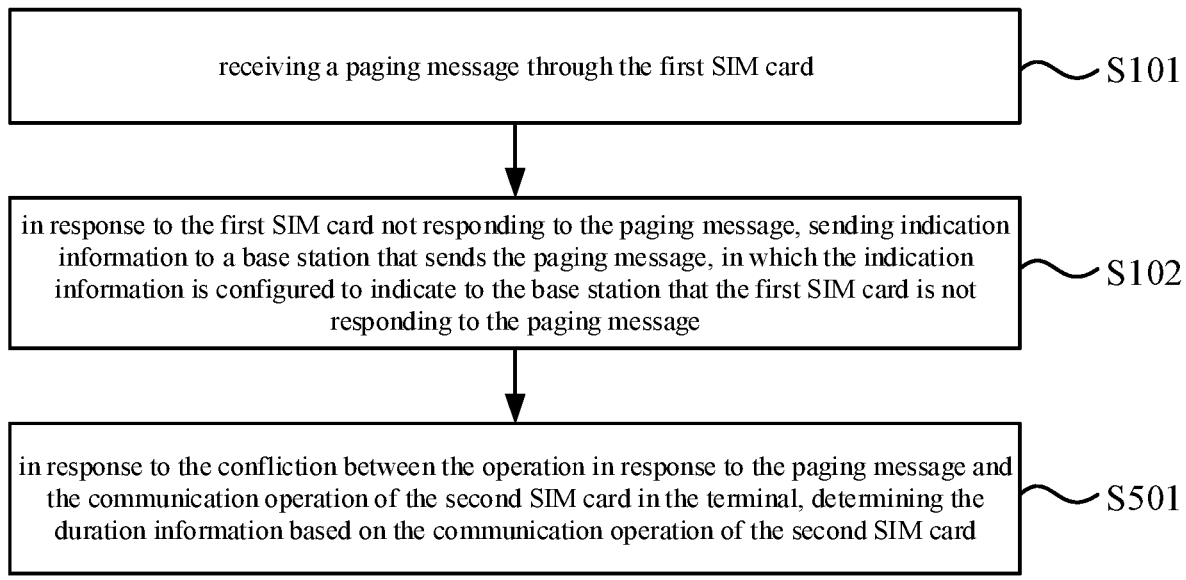
FIG. 5 is a flowchart of a response indication method according to another embodiment of the disclosure.

FIG. 5 is a flowchart of a response indication method according to another embodiment of the disclosure. In some embodiments, as shown in FIG. 5, the response indication method includes the following steps.

At step S501, in response to the confliction between the operation in response to the paging message and the communication operation of the second SIM card in the terminal, the duration information during which the first SIM does not respond to paging message is determined based on the communication operation of the second SIM card.

In an embodiment, when the first SIM card does not respond to the paging message due to the confliction between the operation in response to the paging message and the communication operation of the second SIM card in the terminal, the duration information may be determined based on the communication operation of the second SIM card. For example, a duration of the communication operation of the second SIM card may be predicted, and the duration predicted may then be used as the duration information.

It should be noted that in addition to determining the duration information based on the communication operation of the second SIM card, the duration information can also be determined in other ways. For example, the terminal can determine the duration information as a fixed value based on user settings. The duration at which the first SIM card is not to respond to the paging message can be the same each time, or the duration information can be flexibly adjusted based on terminal load, a terminal service type, and a network status.

Figure 6:
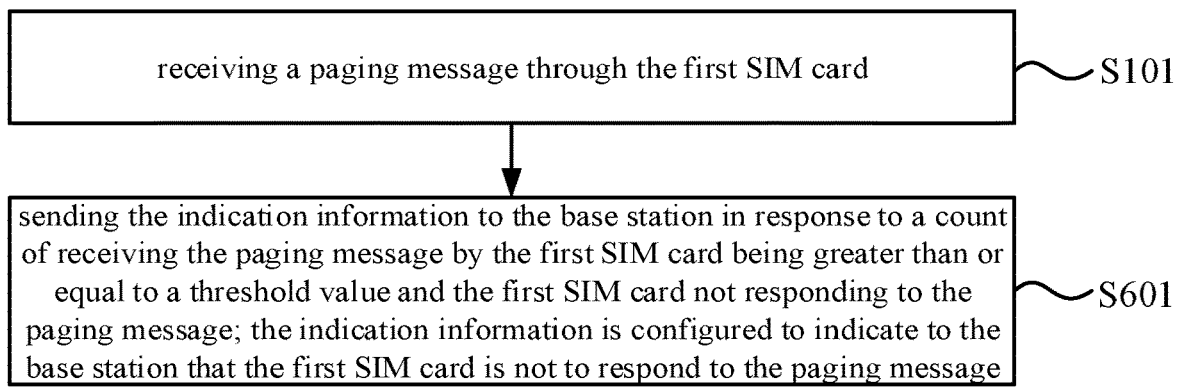
FIG. 6 is a flowchart of a response indication method according to another embodiment of the disclosure.

FIG. 6 is a flowchart of a response indication method according to another embodiment of the disclosure. In some embodiments, in addition to the first SIM card not responding to the paging message, the condition for sending the indication information to the base station that sends the paging message may include other conditions, such as a condition related to a threshold value. As shown in FIG. 6, in response to the first SIM card not responding to the paging message, sending the indication information to the base station that sends the paging message includes the following steps.

At step S601, in response to a count of receiving the paging message by the first SIM card being greater than or equal to a threshold value and the first SIM card not responding to the paging message, the indication information is sent to the base station.

In an embodiment, it is not necessary to immediately send the indication information to the base station in response to determining that the first SIM card is not to respond to the paging message. For some base stations, the base stations do not page the first SIM card several times repeatedly if the first SIM card is not to respond to the paging message. In this case, not sending the indication information to the base station does not cause the base station to perform unnecessary operations.

Based on this embodiment, in response to determining that the first SIM card does not respond to the paging message, the count of receiving the paging message can be recorded. If the count is greater than or equal to the threshold value (which can be predetermined), it can be determined that the base station pages the first SIM card several times, and then the indication information can be sent to the base station to enable the base station to determine that the cause why the first SIM card does not respond to the paging message is not due to a problem of the base station, thus avoiding wasting resources by re-paging the first SIM card in a short time.

Figure 7:
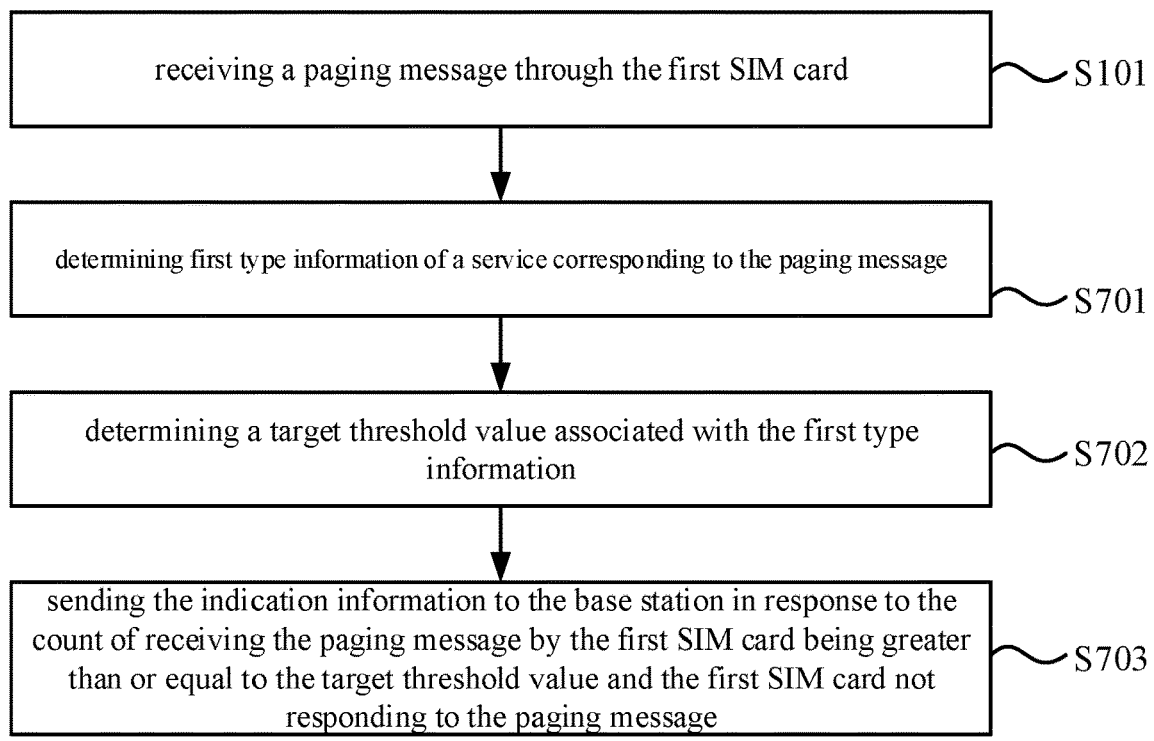
FIG. 7 is a flowchart of a response indication method according to another embodiment of the disclosure.

FIG. 7 is a flowchart of a response indication method according to another embodiment of the disclosure. In some embodiments, different threshold values may be configured for different types of services. As shown in FIG. 7, sending the indication information to the base station in response to the count of receiving the paging message by the first SIM card being greater than or equal to the threshold value and the first SIM card not responding to the paging message includes the following steps.

At step S701, first type information of a service corresponding to the paging message is determined.

At step S702, a target threshold value associated with the first type information is determined.

At step S703, in response to the count of receiving the paging message by the first SIM card being greater than or equal to the target threshold value and the first SIM card not responding to the paging message, the indication information is sent to the base station.

In an embodiment, the threshold value can be configured separately for each service type, and the threshold values corresponding to different service types may be the same or may be different.

Since the threshold value is configured separately for each service type, in order to accurately determine a relation between the count of the paging message and the threshold value, the first type information of the service corresponding to the paging message may be determined, and the target threshold value associated with the first type information may be determined, and then the relation between the count of receiving the paging message by the first SIM card and the target threshold value is determined. If the count of receiving the paging message by the first SIM card is greater than or equal to the target threshold value, the indication information is sent to the base station in a case that the first SIM card does not respond to the paging message.

In an embodiment, the threshold value may be set by a user of the terminal or may be configured by a network side device (e.g., a core network and a base station). The network side device may configure the threshold value for the terminal via a non-access layer signaling and/or an access layer signaling.

Figure 8:
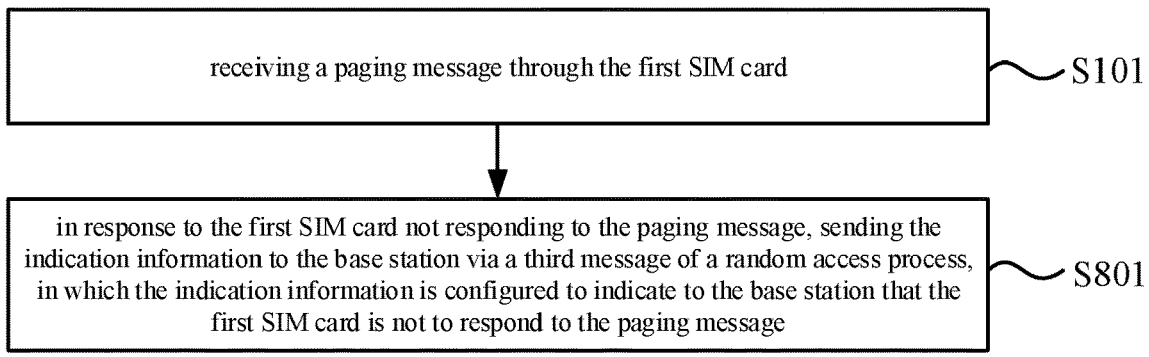
FIG. 8 is a flowchart of a response indication method according to another embodiment of the disclosure.

FIG. 8 is a flowchart of a response indication method according to another embodiment of the disclosure. In some embodiments, as shown in FIG. 8, sending the indication information to the base station that sends the paging message includes the following steps.

At step S801, the indication information is sent to the base station via a third message MSG3 of a random access process.

In an embodiment, in order to send the indication information to the base station, the first SIM card may initiate a random access to the base station, and the indication information is carried in the MSG3 of the random access process, to send to the base station. Thus, there is no need to set a new signaling to carry the indication information, thereby saving signaling overhead.

It is to be noted that generally, if the first SIM card does not respond to the paging message, no communication connection is established with the base station, so that the first SIM card initiates the random access to the base station, by briefly establishing a communication connection with the base station, or by stopping the random access, the base station does not feedback a fourth message MSG4 of the random access process to the first SIM card after sending the MSG3.

The indication information may be carried via an RRCConnectionRequest or RRCSetupRequest signaling of the MSG3 and sent to the base station. When the cause information about why the first SIM card is not to respond to the paging message is sent to the base station, the cause information may be carried via an EstablishmentCause information element of the RRCConnectionRequest or RRCSetupRequest signaling to send to the base station.

Figure 9:
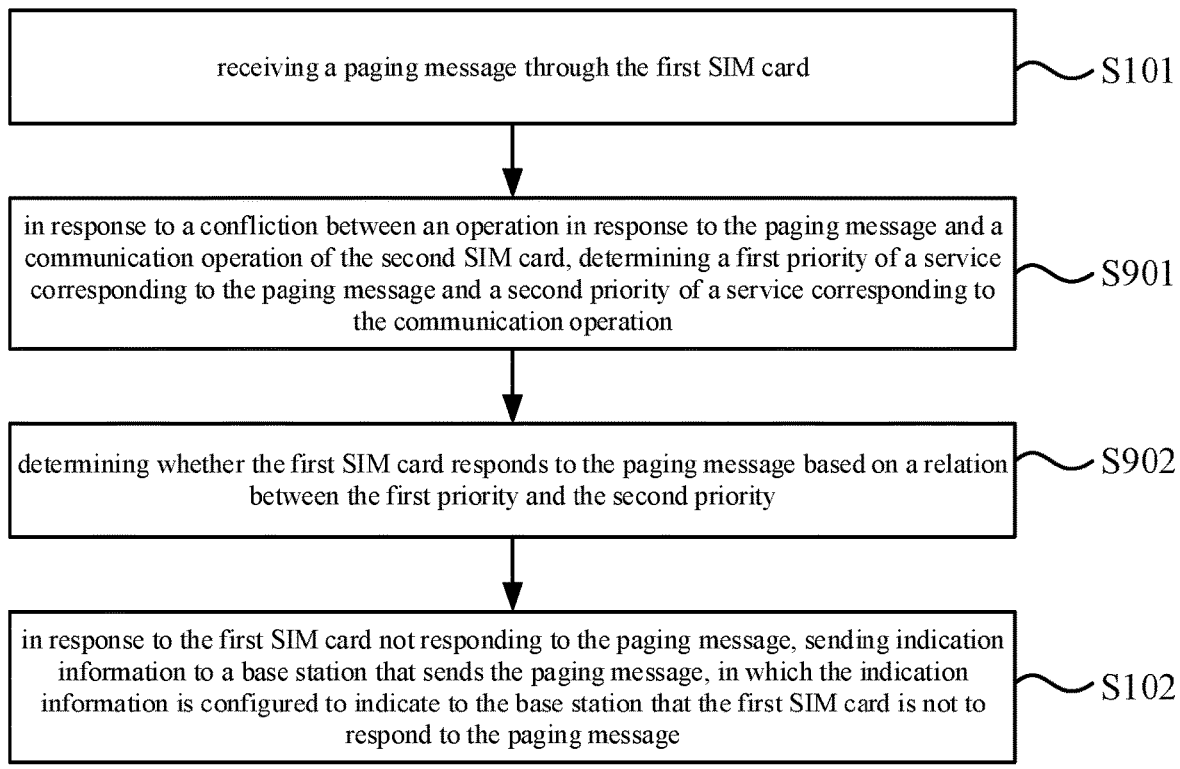
FIG. 9 is a flowchart of a response indication method according to another embodiment of the disclosure.

FIG. 9 is a flowchart of a response indication method according to another embodiment of the disclosure. In some embodiments, it may be determined whether to respond to the paging message based on the priorities of services. As shown in FIG. 9, the terminal is further provided with a second SIM card, and the method further includes the following steps.

At step S901, in response to a confliction between an operation in response to the paging message and a communication operation of the second SIM card, a first priority of a service corresponding to the paging message and a second priority of a service corresponding to the communication operation are determined.

At step S902, it is determined whether the first SIM card responds to the paging message based on a relation between the first priority and the second priority.

In an embodiment, when the operation in response to the paging message of the first SIM card conflicts with the communication operation of the second SIM card, the first priority of the service corresponding to the paging message and the second priority of the service corresponding to the communication operation may be determined, and then it is determined whether the first SIM card responds to the paging message based on the relation between the first priority and the second priority.

For example, if the second priority is higher than the first priority, it is determined that the first SIM card does not respond to the paging message, and if the first priority is higher than the second priority, it is determined that the first SIM card responds to the paging message, to ensure that a service with the higher priority is communicated first.

The priority can be set separately for each service type. For example, the priority of the service type URLLC may be set to be higher than the priority of the service type eMBB, the service type of the service corresponding to the paging message received by the first SIM card is eMBB, and the service type of the service corresponding to the communication operation currently performed by the second SIM card is URLLC. Since the priority of URLLC is higher than the priority of eMBB, it is determined that the second priority is higher than the first priority, and it may be determined that the first SIM card does not respond to the paging message.

Figure 10:
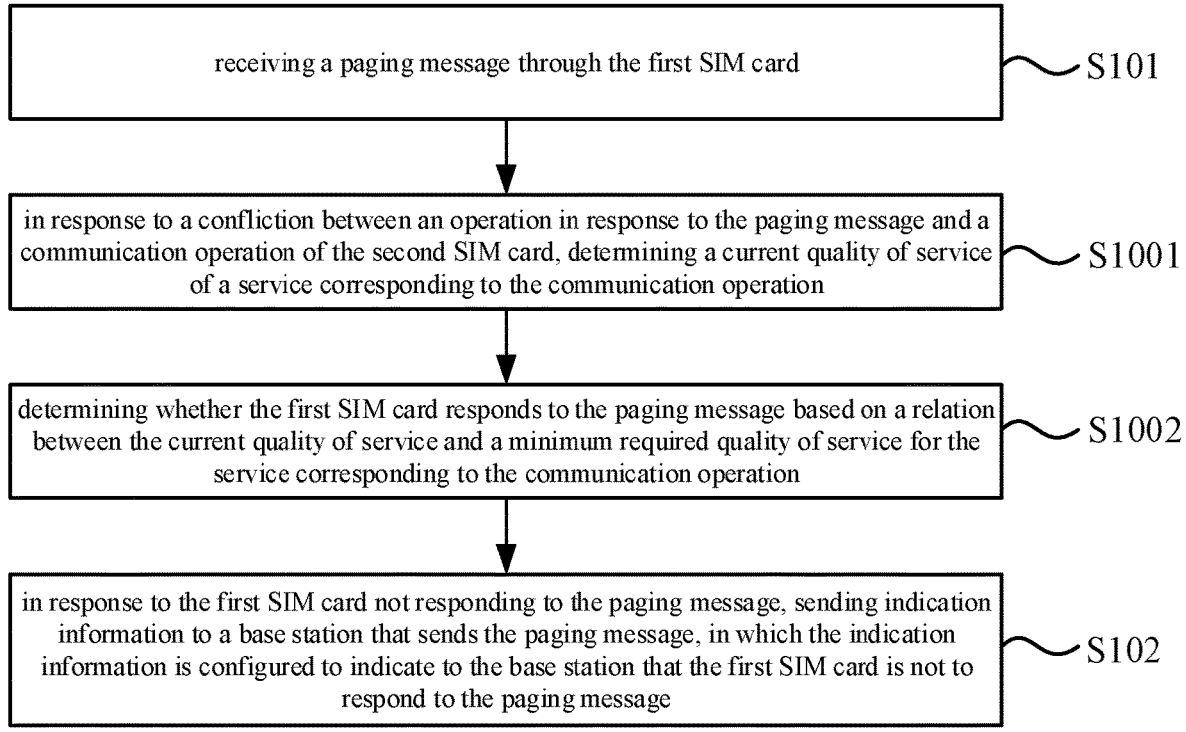
FIG. 10 is a flowchart of a response indication method according to another embodiment of the disclosure.

FIG. 10 is a flowchart of a response indication method according to another embodiment of the disclosure. In some embodiments, whether to respond to the paging message may be determined based on a Quality of Service (QoS) of the service. As shown in FIG. 10, a second SIM card is also provided in the terminal, and the method further includes the following steps.

At step S1001, in response to a confliction between an operation in response to the paging message and a communication operation of the second SIM card, a current QoS of a service corresponding to the communication operation is determined.

At step S1002, it is determined whether the first SIM card responds to the paging message based on a relation between the current QoS and a minimum required QoS for the service corresponding to the communication operation.

In an embodiment, when the operation in response to the paging message of the first SIM card conflicts with the communication operation of the second SIM card, the current QoS of the communication operation of the second SIM card can be determined, and it is determined whether the first SIM card responds to the paging message based on the relation between the current QoS and the minimum required QoS of the service corresponding to the communication operation of the second SIM card.

For example, the current QoS is greater than the minimum required QoS, or the current QoS is much greater than the minimum required QoS (e.g. a ratio of the current QoS to the minimum required QoS is greater than 100), the first SIM card responds to the paging message, otherwise, the first SIM card does not respond to the paging message. Accordingly, the paging message is not responded to when the current QoS is low, so as to ensure that the communication operation of the second SIM card can proceed smoothly, and the paging message can be responded to when the current QoS is sufficiently high, so as to complete the response to the paging message as soon as possible on the basis that the communication operation of the second SIM card can proceed smoothly.

For example, the QoS is expressed in terms of a packet loss rate, the minimum required QoS is $10^{-2}$ per unit time, and the current QoS is $10^{-5}$ per unit time which is much better than the minimum required QoS, so that the paging message can be responded to through the first SIM card in a short time (e.g., the unit time, the unit time may for example be 1 millisecond).

Figure 11:
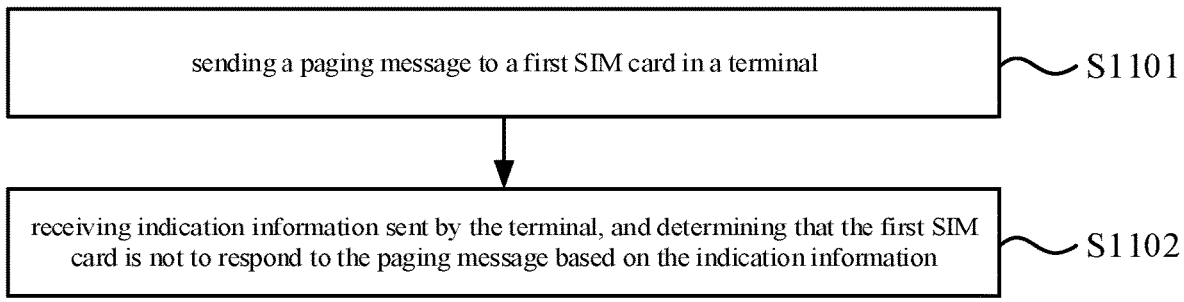
FIG. 11 is a flowchart of a response determination method according to an embodiment of the disclosure.

FIG. 11 is a flowchart of a response determination method according to an embodiment of the disclosure. The response determination method shown in this embodiment may be performed by a base station. The base station includes, but is not limited to, a 4G base station, a 5G base station, and a 6G base station. The base station may communicate with a terminal as a user device. The terminal includes, but is not limited to, a cell phone, a tablet computer, a wearable device, a sensor, an IoT device, and other electronic devices. In an embodiment, the terminal may be a terminal performing the response indication method described in any of the above embodiments.

As shown in FIG. 11, the response determination method includes the following steps.

At step S1101, a paging message is sent to a first SIM card in a terminal.

At step S1102, indication information sent by the terminal is received, and it is determined that the first SIM card is not to respond to the paging message based on the indication information.

According to the embodiment of the disclosure, after the base station sends the paging message to the first SIM card in the terminal, if the first SIM card does not respond to the paging message, the terminal can send the indication information to the base station that sends the paging message, to indicate to the base station that the first SIM card does not respond to the paging message. Accordingly, the base station determines that the first SIM card has received the paging message but does not respond to the paging message, i.e., it determines that the first SIM card does not respond to the paging message due to the internal problem of the terminal rather than the problem of the base station itself. Therefore, unnecessary operations such as increasing the power and/or frequency of sending the paging message can be avoided, which is conducive to saving the resources of the base station.

Figure 12:
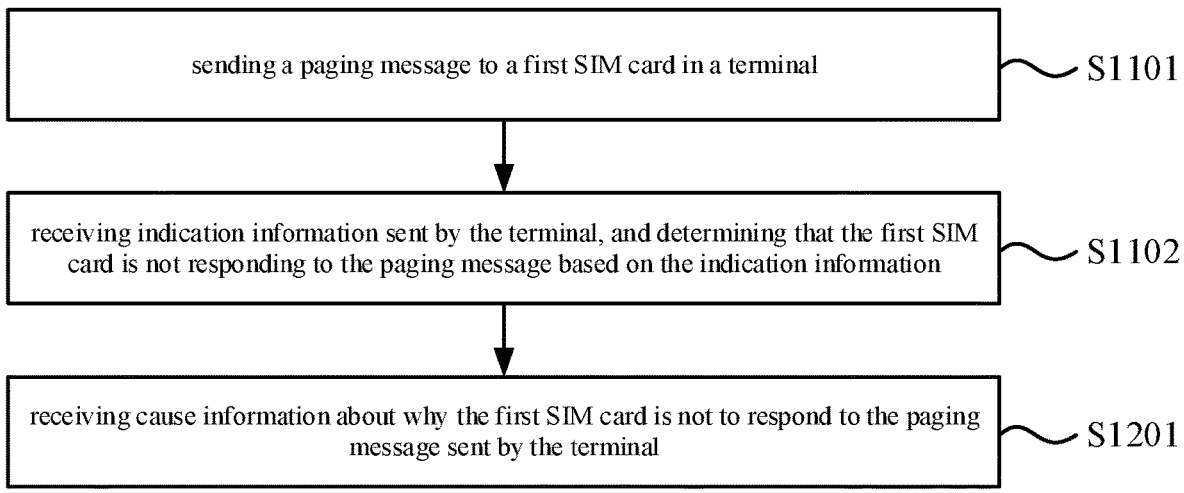
FIG. 12 is a flowchart of a response determination method according to another embodiment of the disclosure.

FIG. 12 is a flowchart of a response determination method according to another embodiment of the disclosure. In some embodiments, the base station may receive, in addition to the indication information, other information, such as cause information. As shown in FIG. 12, the method further includes the following steps.

At step S1201, cause information of the first SIM card is not to respond to the paging message sent by the terminal is received.

In an embodiment, the base station may not only receive the indication information to determine that the first SIM card is not to respond to the paging message, but may also receive the cause why the first SIM card is not to respond to the paging message, so as to determine why the first SIM card is not to respond to the paging message, so that the base station can perform subsequent actions based on that cause.

Optionally, the cause information includes at least one of:
a confliction between an operation in response to the paging message and a communication operation of a second SIM card in the terminal, or canceling the operation in response to the paging message by a user.

Figure 13:
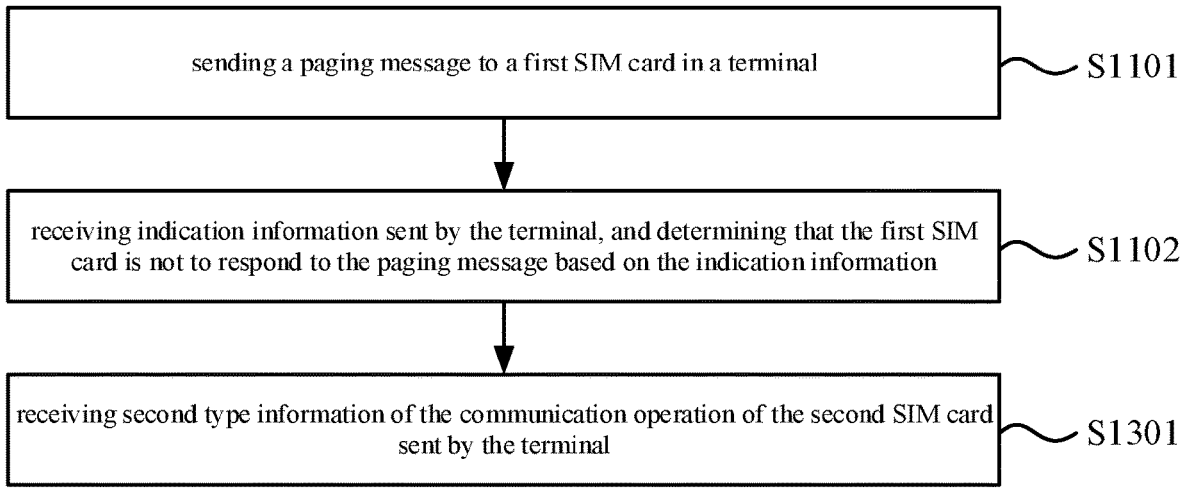
FIG. 13 is a flowchart of a response determination method according to another embodiment of the disclosure.

FIG. 13 is a flowchart of a response determination method according to another embodiment of the disclosure. In some embodiments, the base station may receive, in addition to the indication information, other information, such as type information. As shown in FIG. 13, the cause information includes the confliction between the operation in response to the paging message and the communication operation of the second SIM card in the terminal, and the method further includes the following steps.

At step S1301, second type information of the communication operation of the second SIM card sent by the terminal is received.

In an embodiment, when the cause information of the first SIM card is not to respond to the paging message is the confliction between the operation in response to the paging message and the communication operation of the second SIM card in the terminal, the terminal may determine the second type information of the communication operation of the second SIM card and then send the second type information to the base station, so that the base station can perform the subsequent actions based on the second type information. For example, the base station determines the priority of the communication operation of the second SIM card and the priority of responding to the paging message by the first SIM card based on the second type information.

Figure 14:
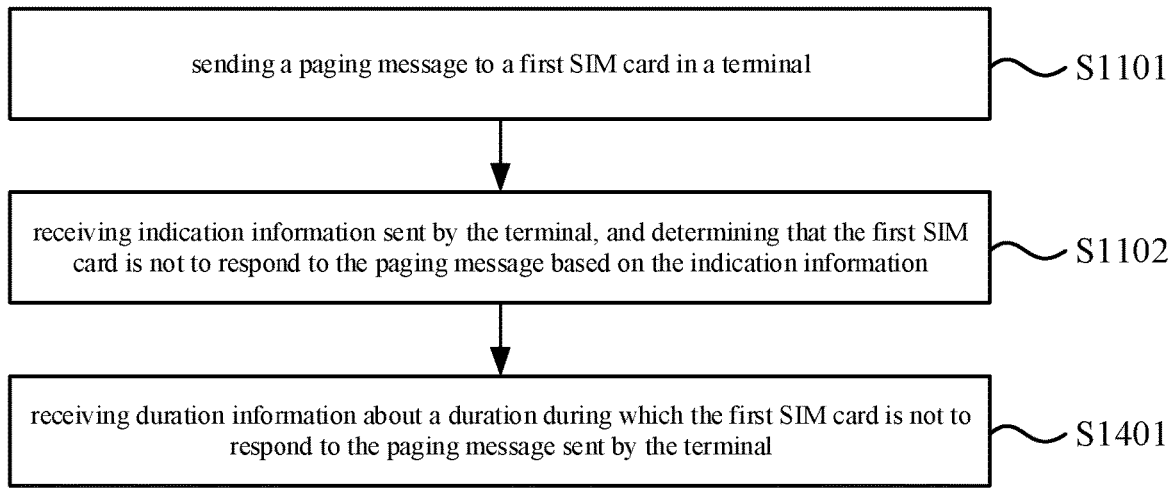
FIG. 14 is a flowchart of a response determination method according to another embodiment of the disclosure.

FIG. 14 is a flowchart of a response determination method according to another embodiment of the disclosure. In some embodiments, the base station may receive, in addition to the indication information, other information, such as duration information. As shown in FIG. 14, the method further includes the following steps.

At step S1401, duration information about a duration during which the first SIM card is not to respond to the paging message sent by the terminal is received.

In an embodiment, the base station may receive the duration information about the duration during which the first SIM card is not to respond to the paging message, so that the duration information can be further determined on the basis of determining that the first SIM card is not to respond to the paging message. That is, how long the first SIM card is not to respond to the paging message is determined, so that the base station can perform subsequent actions based on the cause. For example, the paging message is not sent to the first SIM card during the duration during which the first SIM does not respond to paging message to save resources, and the paging message is sent to the first SIM after the duration during which the first SIM does not respond to paging message.

Figure 15:
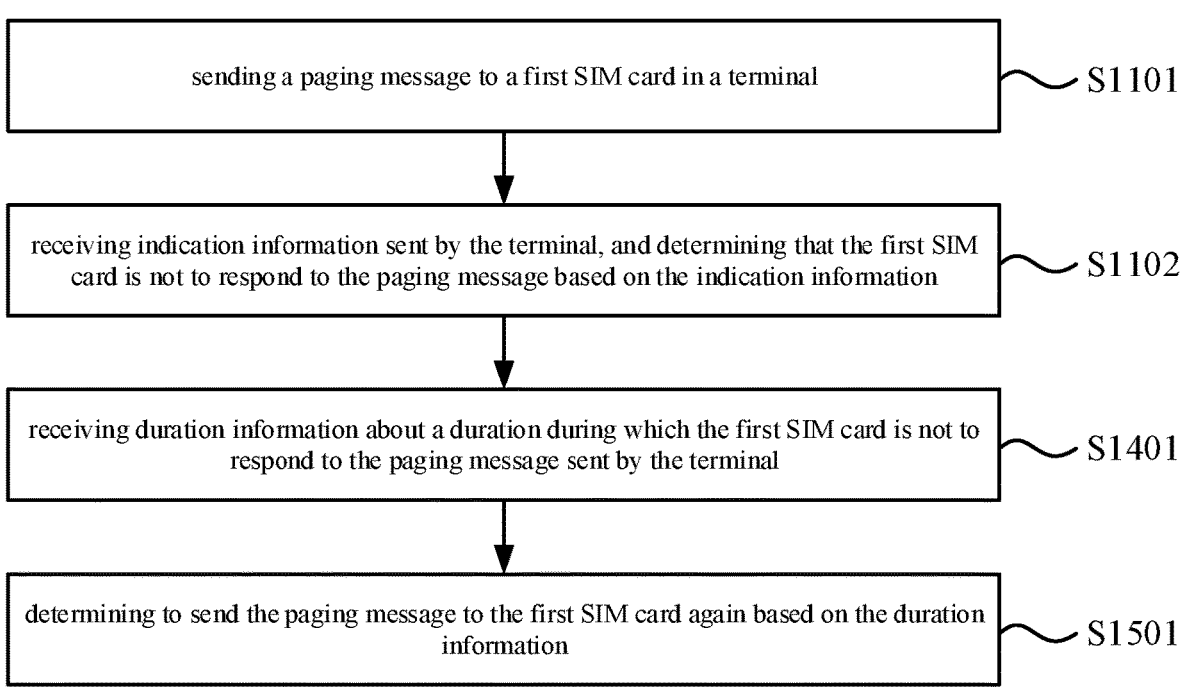
FIG. 15 is a flowchart of a response determination method according to another embodiment of the disclosure.

FIG. 15 is a flowchart of a response determination method according to another embodiment of the disclosure. In some embodiments, as shown in FIG. 15, the method further includes the following steps.

At step S1501, sending the paging message to the first SIM card again is determined based on the duration information.

In an embodiment, after sending the paging message to the first SIM card, if the indication information is received along with the duration information, the base station can determine that the first SIM card may not respond to the paging message during the duration, and the base station may stop sending the paging message to the first SIM card during the duration, to save the resources. The base station may send the paging message to the first SIM card again outside of the duration.

Figure 16:
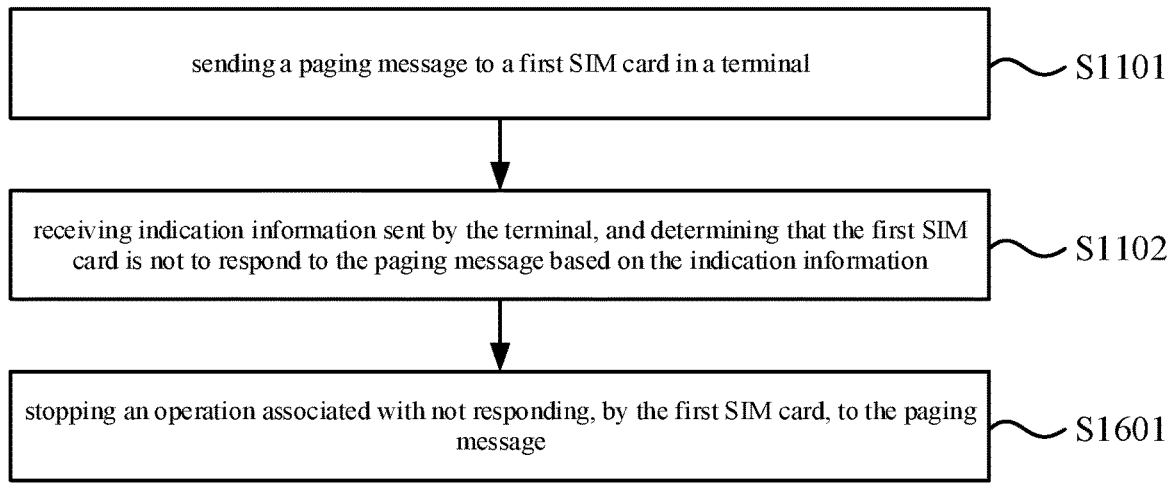
FIG. 16 is a flowchart of a response determination method according to another embodiment of the disclosure.

FIG. 16 is a flowchart of a response determination method according to another embodiment of the disclosure. In some embodiments, as shown in FIG. 16, the method further includes the following steps.

At step S1601, an operation associated with not responding to the paging message by the first SIM card is stopped.

In an embodiment, in a case of receiving the indication information, the terminal can determine that the first SIM card does not respond to the paging message due to the internal problem of the terminal rather than the problem of the base station itself, and then there is no need to perform the operations related to not responding to the paging message by the first SIM card. For example, the base station does not trigger error statistics and does not increase the power and/or frequency of sending the paging message, thereby effectively avoiding the execution of unnecessary operations.

It is noted that the base station stops performing the operation associated with not responding to the paging message by the first SIM card, either for a period of time, for example until the next paging message is sent, or for a subsequent preset length of time.

Figure 17:
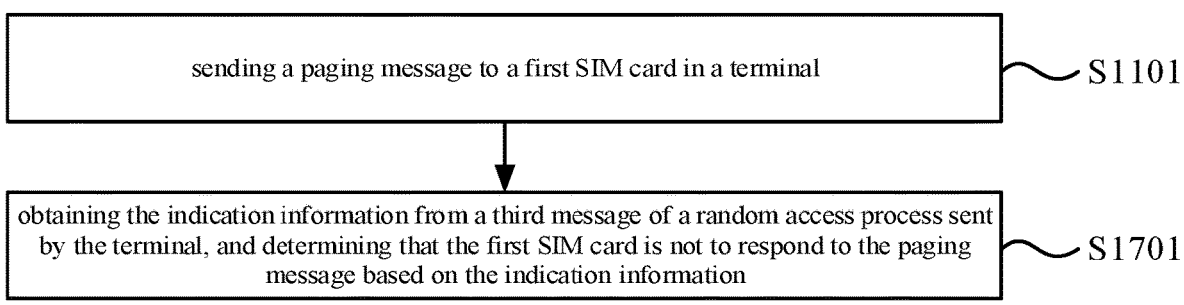
FIG. 17 is a flowchart of a response determination method according to another embodiment of the disclosure.

FIG. 17 is a flowchart of a response determination method according to another embodiment of the disclosure. In some embodiments, as shown in FIG. 17, receiving the indication information sent by the terminal includes the following steps.

At step S1701, the indication information is obtained from a third message of a random access process sent by the terminal.

In an embodiment, in order to send the indication information to the base station, the first SIM card may initiate a random access to the base station, and the indication information is carried in the third message of the random access process to send to the base station, thus there is no need to configure a new signaling to carry the indication information, to save the signaling overhead.

It is noted that generally, if the first SIM card does not respond to the paging message, no communication connection is established with the base station, so that the first SIM card initiates the random access to the base station, by briefly establishing a communication connection with the base station, or by stopping the random access, the base station does not feedback the MSG4 of the random access process to the first SIM card after sending the MSG3.

The indication information may be obtained from the RRCConnectionRequest or RRCSetupRequest signaling of the MSG3. When the terminal sends the cause information of the first SIM card is not to respond to the paging message to the base station, the base station can obtain the cause information from an EstablishmentCause information element of the RRCConnectionRequest or RRCSetupRequest signaling.

Corresponding to the foregoing embodiments of the response indication method and the response determination method, the disclosure also provides the embodiments of a response indication apparatus and a response determination apparatus.

Figure 18:
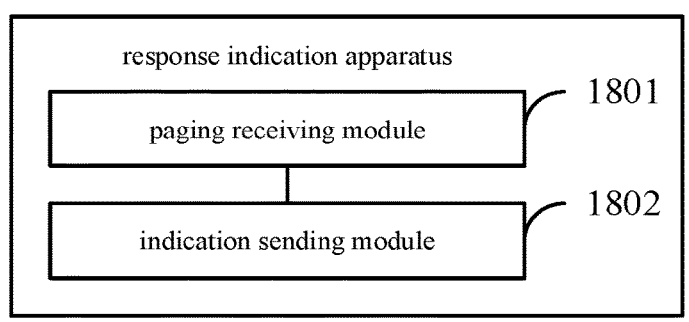
FIG. 18 is a block diagram of a response indication apparatus implemented by a terminal according to an embodiment of the disclosure.

FIG. 18 is a block diagram of a response indication apparatus according to an embodiment of the disclosure. The response indication apparatus shown in this embodiment may be implemented by a terminal. The terminal includes, but is not limited to, a cell phone, a tablet computer, a wearable device, a sensor, an IoT device, and other electronic devices. The terminal, as a user device, may communicate with a base station. The base station includes, but is not limited to, a base station in a communication system, such as a 4G base station, a 5G base station, and a 6G base station. In an embodiment, the base station may be a base station implementing the response determination apparatus described in any of the subsequent embodiments.

One or more SIM cards may be provided in the terminal. For example, the terminal includes a first SIM card, or the terminal includes a first SIM card and a second SIM card. In a case that multiple SIM cards are provided in the terminal, some or all of the SIM cards in the multiple SIM cards may access to different operator networks respectively or to the same operator network. The communication modes supported by the multiple SIMs can be set as desired, such as dual SIM single standby, dual SIM dual standby single active, and dual SIM dual standby dual active.

As shown in FIG. 18, the apparatus may include: a paging receiving module 1801 and an indication sending module 1802.

The paging receiving module 1801 is configured to receive a paging message through the first SIM card.

The indication sending module 1802 is configured to, in response to the first SIM card not responding to the paging message, send indication information to a base station that sends the paging message.

The indication information is configured to indicate to the base station that the first SIM card is not to respond to the paging message.

Figure 19:
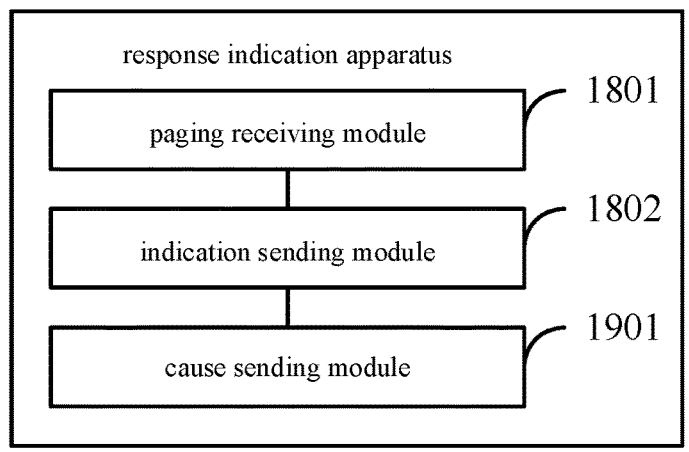
FIG. 19 is a block diagram of a response indication apparatus according to another embodiment of the disclosure.

FIG. 19 is a block diagram of a response indication apparatus according to another embodiment of the disclosure. As shown in FIG. 19, the apparatus further includes: a cause sending module 1901.

The cause sending module 1901 is configured to send cause information of the first SIM card is not to respond to the paging message to the base station.

Optionally, the cause information includes at least one of:
a confliction between an operation in response to the paging message and a communication operation of a second SIM card in the terminal, or canceling the operation in response to the paging message by a user.

Figure 20:
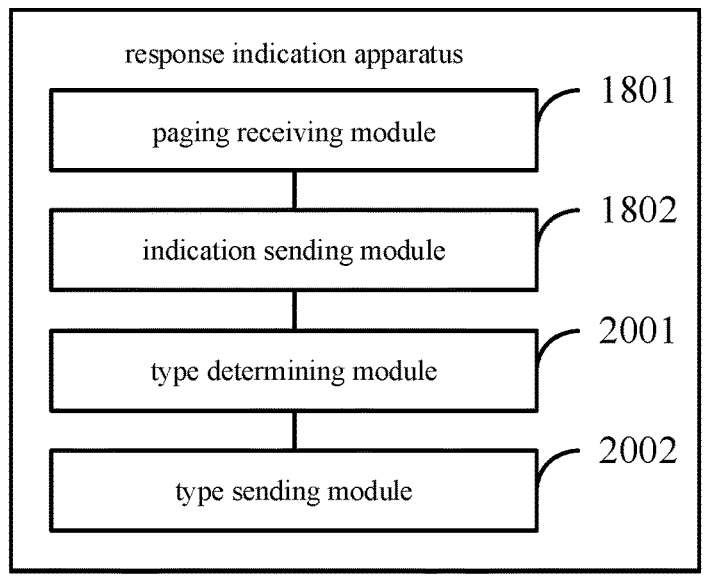
FIG. 20 is a block diagram of a response indication apparatus according to another embodiment of the disclosure.

FIG. 20 is a block diagram of a response indication apparatus according to another embodiment of the disclosure. As shown in FIG. 20, the cause information includes the confliction between the operation in response to the paging message and the communication operation of the second SIM card in the terminal, and the apparatus further includes: a type determining module 2001 and a type sending module 2002.

The type determining module 2001 is configured to determine second type information of the communication operation of the second SIM card.

The type sending module 2002 is configured to send the second type information to the base station.

Figure 21:
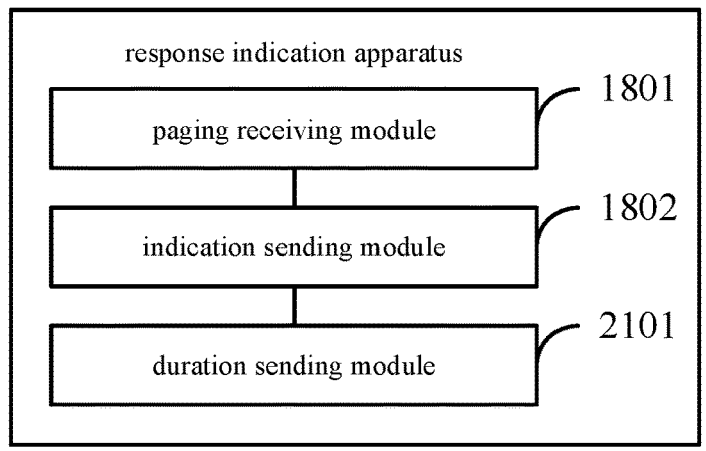
FIG. 21 is a block diagram of a response indication apparatus according to another embodiment of the disclosure.

FIG. 21 is a block diagram of a response indication apparatus according to another embodiment of the disclosure. As shown in FIG. 21, the apparatus further includes: a duration sending module 2101.

The duration sending module 2101 is configured to send duration information about a duration during which the first SIM card is not to respond to the paging message to the base station.

Figure 22:
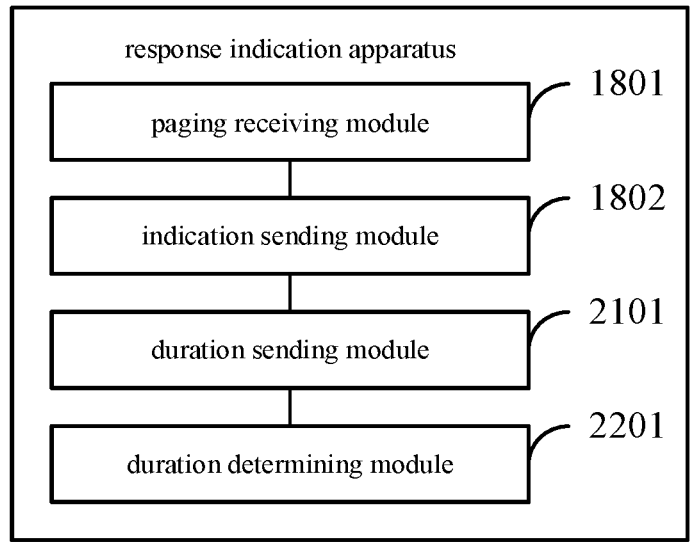
FIG. 22 is a block diagram of a response indication apparatus according to another embodiment of the disclosure.

FIG. 22 is a block diagram of a response indication apparatus according to another embodiment of the disclosure. As shown in FIG. 22, the apparatus further includes: a duration determining module 2201.

The duration determining module 2201 is configured to, in response to the confliction between the operation in response to the paging message and the communication operation of the second SIM card in the terminal, determine the duration information during which the first SIM does not respond to paging message based on the communication operation of the second SIM card.

Optionally, the indication sending module is configured to: send the indication information to the base station in response to a count of receiving the paging message by the first SIM card being greater than or equal to a threshold value and the first SIM card not responding to the paging message.

Optionally, the indication sending module is configured to: determine first type information of a service corresponding to the paging message; determine a target threshold value associated with the first type information; and send the indication information to the base station in response to the count of receiving the paging message by the first SIM card being greater than or equal to the target threshold value and the first SIM card not responding to the paging message.

Optionally, the indication sending module is configured to: send the indication information to the base station via a third message of a random access process.

Figure 23:
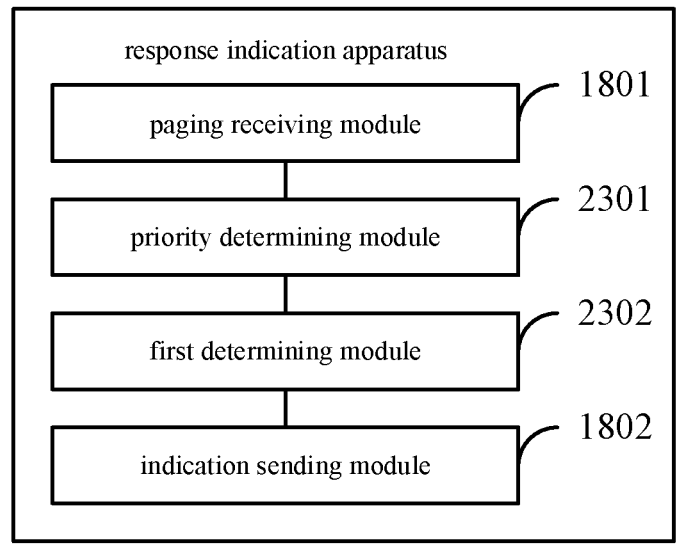
FIG. 23 is a block diagram of a response indication apparatus according to another embodiment of the disclosure.

FIG. 23 is a block diagram of a response indication apparatus according to another embodiment of the disclosure. As shown in FIG. 23, the terminal is provided with a second SIM card, and the apparatus further includes: a priority determining module 2301 and a first determining module 2302.

The priority determining module 2301 is configured to, in response to a confliction between an operation in response to the paging message and a communication operation of the second SIM card, determine a first priority of a service corresponding to the paging message and a second priority of a service corresponding to the communication operation.

The first determining module 2302 is configured to determine whether the first SIM card responds to the paging message based on a relation between the first priority and the second priority.

Figure 24:
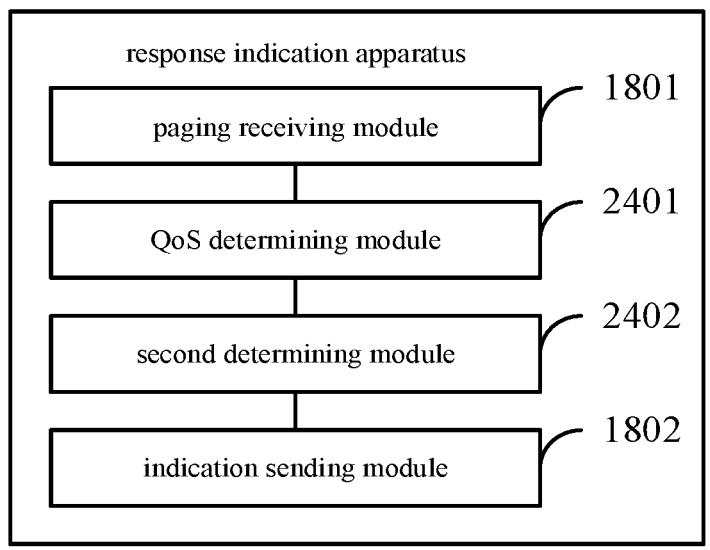
FIG. 24 is a block diagram of a response indication apparatus according to another embodiment of the disclosure.

FIG. 24 is a block diagram of a response indication apparatus according to another embodiment of the disclosure. As shown in FIG. 24, the terminal is provided with a second SIM card, and the apparatus further includes: a QoS determining module 2401 and a second determining module 2402.

The QoS determining module 2401 is configured to, in response to a confliction between an operation in response to the paging message and a communication operation of the second SIM card, determine a current QoS of a service corresponding to the communication operation.

The second determining module 2402 is configured to determine whether the first SIM card responds to the paging message based on a relation between the current QoS and a minimum required QoS for the service corresponding to the communication operation.

Figure 25:
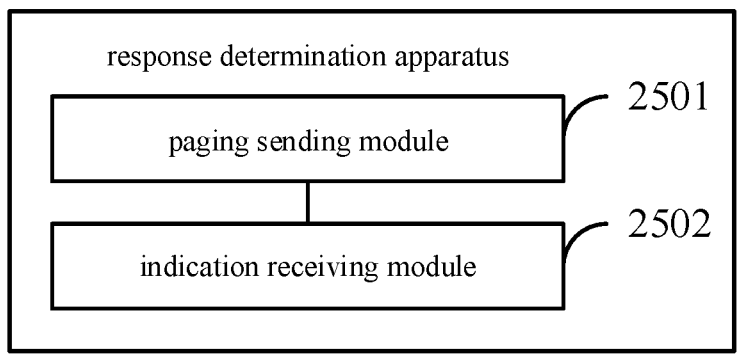
FIG. 25 is a block diagram of a response determination apparatus implemented by a base station according to an embodiment of the disclosure.

FIG. 25 is a block diagram of a response determination apparatus according to an embodiment of the disclosure. The response determination apparatus shown in this embodiment may be implemented by a base station. The base station includes, but is not limited to, a 4G base station, a 5G base station, and a 6G base station. The base station may communicate with a terminal which is as a user device. The terminal includes, but is not limited to, a cell phone, a tablet computer, a wearable device, a sensor, an IoT device, and other electronic devices. In an embodiment, the terminal may be a terminal implementing the response indication apparatus described in any of the above embodiments is applicable.

As shown in FIG. 25, the response determination apparatus may include: a paging sending module 2501 and an indication receiving module 2502.

The paging sending module 2501 is configured to send a paging message to a first SIM card in a terminal.

The indication receiving module 2502 is configured to receive indication information sent by the terminal, and determine that the first SIM card is not to respond to the paging message based on the indication information.

Figure 26:
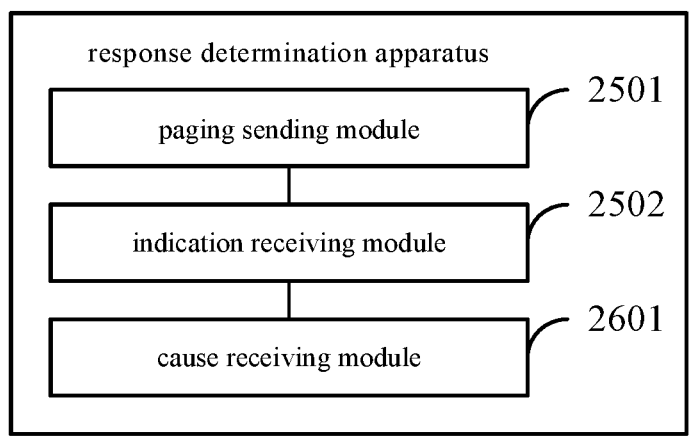
FIG. 26 is a block diagram of a response determination apparatus according to another embodiment of the disclosure.

FIG. 26 is a block diagram of a response determination apparatus according to another embodiment of the disclosure. As shown in FIG. 26, the response determination apparatus may include: a cause receiving module 2601.

The cause receiving module 2601 is configured to receive cause information of the first SIM card not responding to the paging message sent by the terminal.

Optionally, the cause information includes at least one of:
a confliction between an operation in response to the paging message and a communication operation of a second SIM card in the terminal, or canceling the operation in response to the paging message by a user.

Figure 27:
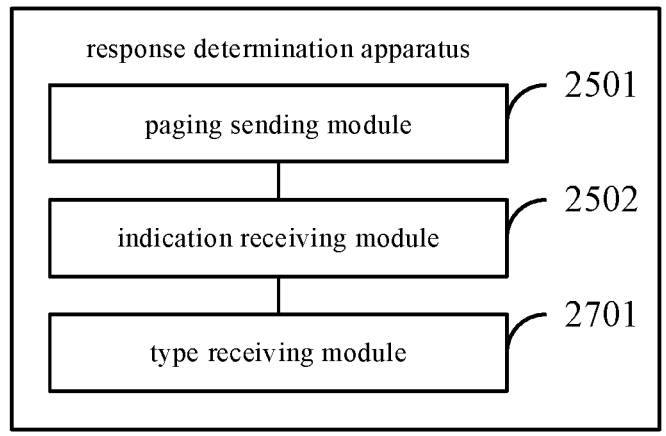
FIG. 27 is a block diagram of a response determination apparatus according to another embodiment of the disclosure.

FIG. 27 is a block diagram of a response determination apparatus according to another embodiment of the disclosure. As shown in FIG. 27, the cause information includes the confliction between the operation in response to the paging message and the communication operation of the second SIM card in the terminal, and the apparatus further includes: a type receiving module 2701.

The type receiving module 2701 is configured to receive second type information of the communication operation of the second SIM card sent by the terminal.

Figure 28:
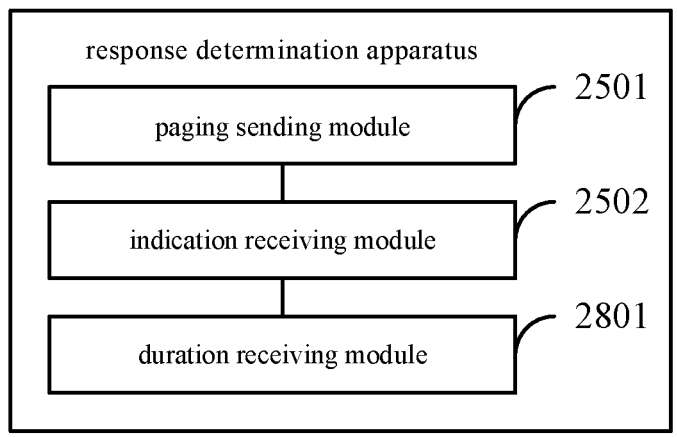
FIG. 28 is a block diagram of a response determination apparatus according to another embodiment of the disclosure.

FIG. 28 is a block diagram of a response determination apparatus according to another embodiment of the disclosure. As shown in FIG. 28, the apparatus further includes: a duration receiving module 2801.

The duration receiving module 2801 is configured to receive duration information about a duration during which the first SIM card is not to respond to the paging message sent by the terminal.

Optionally, the paging sending module is further configured to determine to send the paging message to the first SIM card again based on the duration information.

Figure 29:
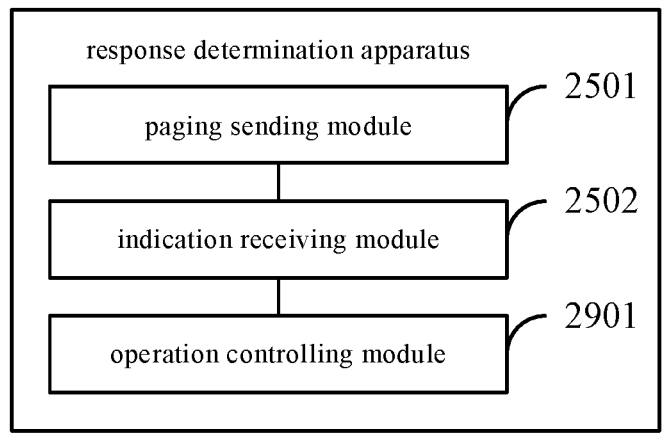
FIG. 29 is a block diagram of a response determination apparatus according to another embodiment of the disclosure.

FIG. 29 is a block diagram of a response determination apparatus according to another embodiment of the disclosure. As shown in FIG. 29, the apparatus further includes: an operation controlling module 2901.

The operation controlling module 2901 is configured to stop an operation associated with not responding to the paging message by the first SIM card.

Optionally, the indication receiving module is configured to obtain the indication information from a third message of a random access process sent by the terminal.

With respect to the apparatuses in the above embodiments, the specific way in which each module performs its operation has been described in detail in the embodiments of the relevant methods, and will not be described in detail here.

The apparatus embodiments basically correspond to the method embodiments, the related contents can refer to part of the descriptions of the method embodiments. The above-described apparatus embodiments are merely schematic, the modules described above as separate components may or may not be physically separated, and the components displayed as modules may or may not be physical modules, i.e., the components may be located in one area or may be distributed to multiple network modules. Some or all of these modules can be selected according to practical needs to achieve the purpose of the solution of the disclosure. Those skilled in the art can understand and implement the solution without inventive works.

The embodiment of the disclosure provides an electronic device. The electronic device includes:
- a processor; and
- a memory storing instructions executable by the processor.
- the processor is configured to implement the response indication method of any one of the above embodiments, and/or the response determination method of any one of the above embodiments.

The embodiment of the disclosure provides a computer readable storage medium having computer programs stored thereon. When the programs are executed by a processor, the response indication method of any one of the above embodiments, and/or the response determination method of any one of the above embodiments is implemented.

Figure 30:
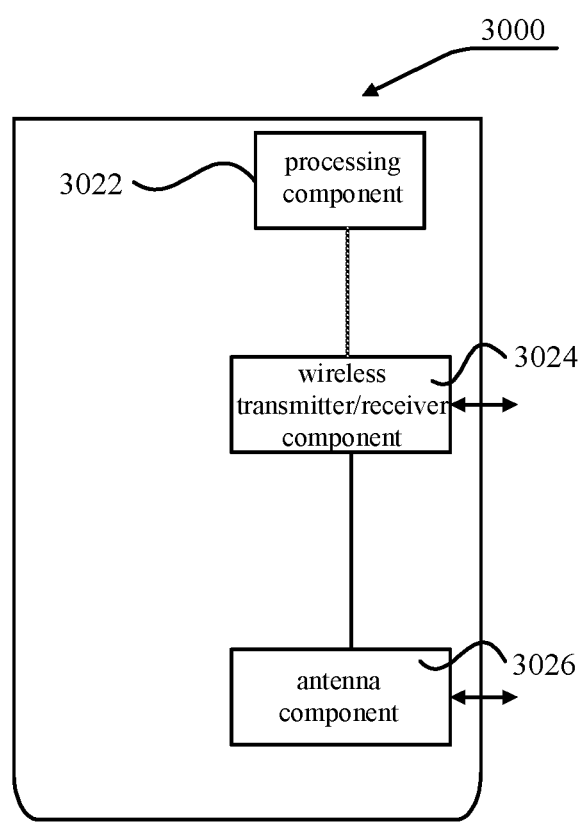
FIG. 30 is a schematic diagram of a device for response determination according to an embodiment of the disclosure.

As shown in FIG. 30, FIG. 30 is a schematic diagram of a device 3000 for response determination according to an embodiment of the disclosure. The device 3000 may be provided as a base station. As shown in FIG. 30, the device 3000 includes a processing component 3022, a wireless transmitter/receiver component 3024, an antenna component 3026, and a signal processing portion specific to a wireless interface. The processing component 3022 may include one or more processors. One of the processors of the processing component 3022 may be configured to implement the response determination method described in any one of the above embodiments.

Figure 31:
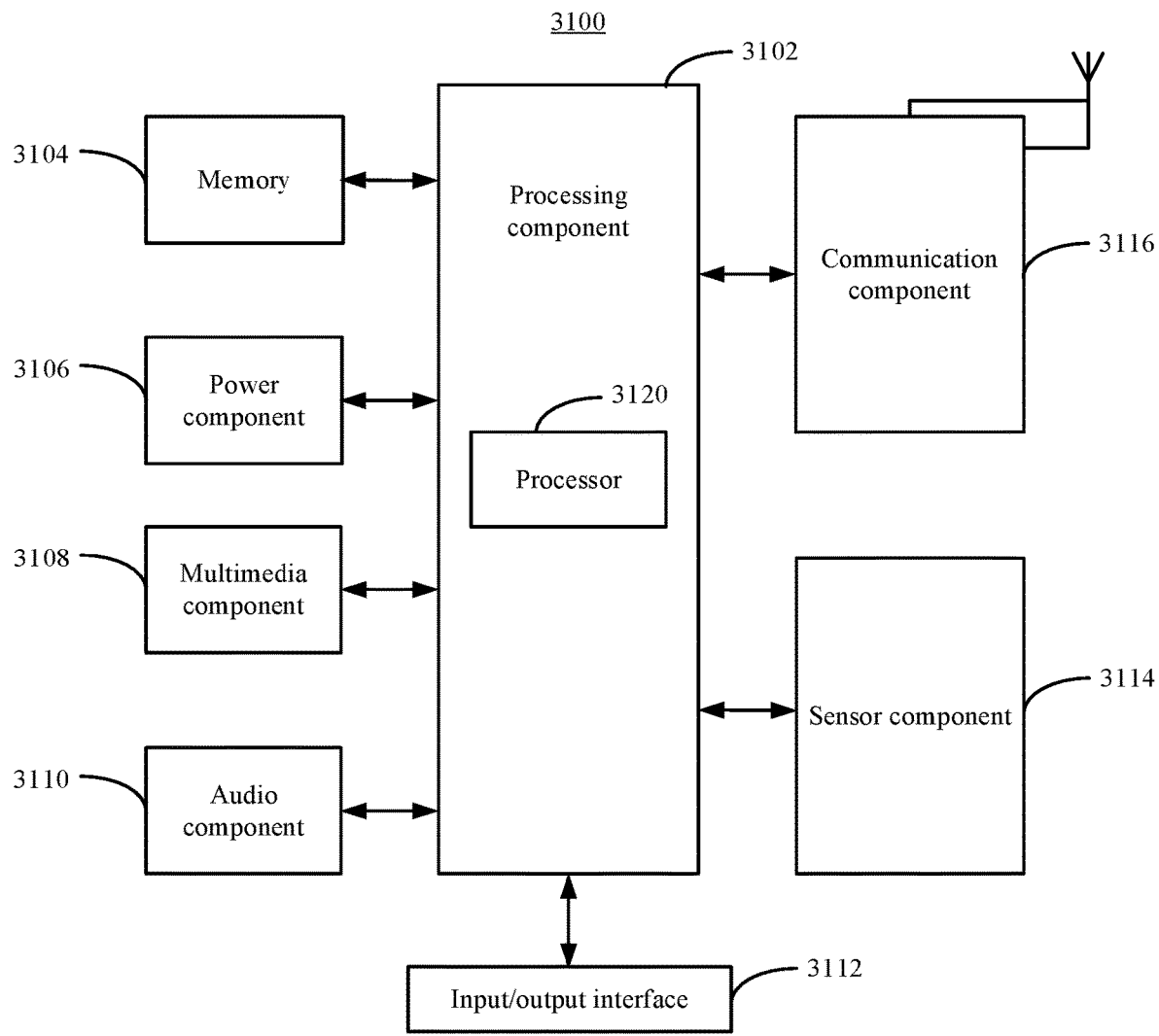
FIG. 31 is a schematic diagram of a device for response indication according to an embodiment of the disclosure.

FIG. 31 is a schematic diagram of a device 3100 for response indication according to the embodiment of the disclosure. For example, the device 3100 may be a cell phone, a computer, a digital broadcast terminal, a message transceiver device, a game console, a tablet device, a medical device, a fitness device and a personal digital assistant, etc.

As shown in FIG. 31, the device 3100 may include one or more of the following components: a processing component 3102, a memory 3104, a power component 3106, a multimedia component 3108, an audio component 3110, an input/output (I/O) interface 3112, a sensor component 3114, and a communication component 3116.

The processing component 3102 typically controls overall operations of the device 3100, such as the operations associated with display, telephone calls, data communications, camera operations, and recording operations. The processing component 3102 may include one or more processors 3120 to perform all or part of the steps in the response indication method described above. Moreover, the processing component 3102 may include one or more modules which facilitate the interaction between the processing component 3102 and other components. For example, the processing component 3102 may include a multimedia module to facilitate the interaction between the multimedia component 3108 and the processing component 3102.

The memory 3104 is configured to store various types of data to support the operations of the device 3100. Examples of such data include instructions for any applications or methods operated on the device 3100, contact data, phonebook data, messages, pictures, video, etc. The memory 3104 may be implemented using any type of volatile or non-volatile memory devices, or a combination thereof, such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic disk or optical disk.

The power component 3106 provides power to various components of the device 3100. The power component 3106 may include a power management system, one or more power sources, and any other components associated with the generation, management, and distribution of power in the device 3100.

The multimedia component 3108 includes a screen providing an output interface between the device 3100 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3108 includes a front-facing camera and/or a rear-facing camera. When the device 3100 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3110 is configured to output and/or input audio signals. For example, the audio component 3110 includes a microphone (MIC) configured to receive an external audio signal when the device 3100 is in an operation mode, such as a call mode, a recording mode, and a voice recognition mode. The received audio signal may be further stored in the memory 3104 or transmitted via the communication component 3116. In some embodiments, the audio component 3110 further includes a speaker to output audio signals.

The I/O interface 3112 provides an interface between the processing component 3102 and peripheral interface modules, such as a keyboard, a click wheel, buttons, and the like. The buttons may include, but are not limited to, a home button, a volume button, a starting button, and a locking button.

The sensor component 3114 includes one or more sensors to provide status assessments of various aspects of the device 3100. For instance, the sensor component 3114 may detect an open/closed status of the device 3100, relative positioning of components, e.g., the display and the keypad, of the device 3100, a change in position of the device 3100 or a component of the device 3100, a presence or absence of user contact with the device 3100, an orientation or an acceleration/deceleration of the device 3100, and a change in temperature of the device 3100. The sensor component 3114 may include a proximity sensor configured to detect the presence of nearby objects without any physical contact. The sensor component 3114 may also include a light sensor, such as a Complementary Metal Oxide Semiconductor (CMOS) or Charge-Coupled Device (CCD) image sensor, for use in imaging applications. In some embodiments, the sensor component 3114 may also include an accelerometer sensor, a gyroscope sensor, a magnetic sensor, a pressure sensor, or a temperature sensor.

The communication component 3116 is configured to facilitate communication, wired or wirelessly, between the device 3100 and other devices. The device 3100 can access a wireless network based on a communication standard, such as WiFi, 2G, 3G, 4G LTE, 5G NR or a combination thereof. In an exemplary embodiment, the communication component 3116 receives a broadcast signal or broadcast associated information from an external broadcast management system via a broadcast channel. In an exemplary embodiment, the communication component 3116 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the device 3100 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the response indication method described above.

In the exemplary embodiments, there is also provided a non-transitory computer readable storage medium including executable instructions, such as the memory 3104, executable by the processor 3120 in the device 3100, for performing the response indication method described above. For example, the non-transitory computer-readable storage medium may be a ROM, a Random Access Memory (RAM), a CD-ROM, a magnetic tape, a floppy disc, and an optical data storage device.

After considering the specification and practicing the disclosure herein, those skilled in the art will easily think of other implementations of the disclosure. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

It should be noted that the relational terms herein, such as "first" and "second", are used only for distinguishing one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

The method and apparatus of the embodiments of the disclosure have been described in detail above, and specific examples are used in the disclosure to illustrate the principles and implementation of the disclosure. The description of the above embodiments are only used to facilitate understanding the method and core ideas of the disclosure. Meanwhile, for those skilled in the art, according to the ideas of this disclosure, there will be changes in the specific implementation and scope of application. In conclusion, the contents of the disclosure should not be understood as limiting the disclosure.

What is claimed is:

1. A response indication method, performed by a terminal, wherein the terminal is at least provided with a first Subscriber Identity Module, SIM, card, and the method comprises:
  receiving a paging message through the first SIM card; and
  sending indication information to a base station that sends the paging message;
  wherein the first SIM card does not respond to the paging message, the indication information indicates to the base station that the first SIM card is not to respond to the paging message;
  wherein sending indication information to a base station that sends the paging message comprises:
  determining first type information of a service corresponding to the paging message;
  determining a target threshold value associated with the first type information;
  and sending the indication information to the base station in a case of a count of receiving the paging message by the first SIM card being greater than or equal to the target threshold value and the first SIM card not responding to the paging message.

2. The method of claim 1, further comprising:
sending cause information of the first SIM card not responding to the paging message to the base station.

3. The method of claim 2, wherein the cause information comprises at least one of:
a confliction between an operation responding to the paging message and a communication operation of a second SIM card in the terminal, or canceling the operation responding to the paging message by a user.

4. The method of claim 3, wherein the cause information comprises the confliction between the operation responding to the paging message and the communication operation of the second SIM card in the terminal, and the method further comprises:
determining second type information of the communication operation of the second SIM card; and
sending the second type information to the base station.

5. The method of claim 1, further comprising:
sending duration information about a duration during which the first SIM card is not to respond to the paging message to the base station.

6. The method of claim 5, further comprising:
determining the duration information based on the communication operation of the second SIM card, wherein the confliction between the operation responding to the paging message and the communication operation of the second SIM card in the terminal.

7. The method of claim 1, wherein sending the indication information to the base station that sends the paging message comprises:
sending the indication information to the base station via a third message of a random access process.

8. The method of claim 1, wherein the terminal is provided with a second SIM card, and the method further comprises:
determining a first priority of a service corresponding to the paging message and a second priority of a service corresponding to the communication operation, wherein a confliction between an operation responding to the paging message and a communication operation of the second SIM card; and
determining whether the first SIM card responds to the paging message based on a relation between the first priority and the second priority.

9. A non-transitory computer readable storage medium having computer programs stored thereon, wherein when the computer programs are executed by a processor, the response indication method of claim 1.

10. A response determination method, performed by a base station, comprising:
sending a paging message to a first SIM card in a terminal; and
receiving indication information sent by the terminal, and determining that the first SIM card is not to respond to the paging message based on the indication information;
wherein receiving indication information sent by the terminal comprises:
receiving the indication information sent by the terminal in a case that the first SIM card does not respond to the paging message and the terminal determines a count of receiving the paging message by the first SIM card being greater than or equal to a target threshold value associated with the first type information of a service corresponding to the paging message.

11. The method of claim 10, further comprising:
receiving cause information of the first SIM card not respond to the paging message sent by the terminal.

12. The method of claim 11, wherein the cause information comprises at least one of:
a confliction between an operation responding to the paging message and a communication operation of a second SIM card in the terminal, or canceling the operation responding to the paging message by a user.

13. The method of claim 11, wherein the cause information comprises the confliction between the operation responding to the paging message and the communication operation of the second SIM card in the terminal, and the method further comprises:
receiving second type information of the communication operation of the second SIM card sent by the terminal.

14. The method of claim 10, further comprising:
receiving duration information about a duration during which the first SIM card is not to respond to the paging message sent by the terminal.

15. The method of claim 14, further comprising:
determining to send the paging message to the first SIM card again based on the duration information.

16. A non-transitory computer readable storage medium having computer programs stored thereon, wherein when the computer programs are executed by a processor, the response determination method of claim 10.

17. A communication device, comprising:
a processor; and
a memory for storing instructions executable by the processor; wherein
the processor is configured to implement the response determination method of claim 10.

18. A communication device, comprising:
a processor; and
a memory for storing instructions executable by the processor; wherein
the processor is configured to implement a response indication method, comprising:
receiving a paging message through a first SIM card; and
sending indication information to a base station that sends the paging message;
wherein the first SIM card does not respond to the paging message, the indication information indicates to the base station that the first SIM card is not to respond to the paging message;
wherein sending indication information to a base station that sends the paging message comprises:
determining first type information of a service corresponding to the paging message;
determining a target threshold value associated with the first type information;
and sending the indication information to the base station in a case of a count of receiving the paging message by the first SIM card being greater than or equal to the target threshold value and the first SIM card not responding to the paging message.

* * * * *